Figure 1:
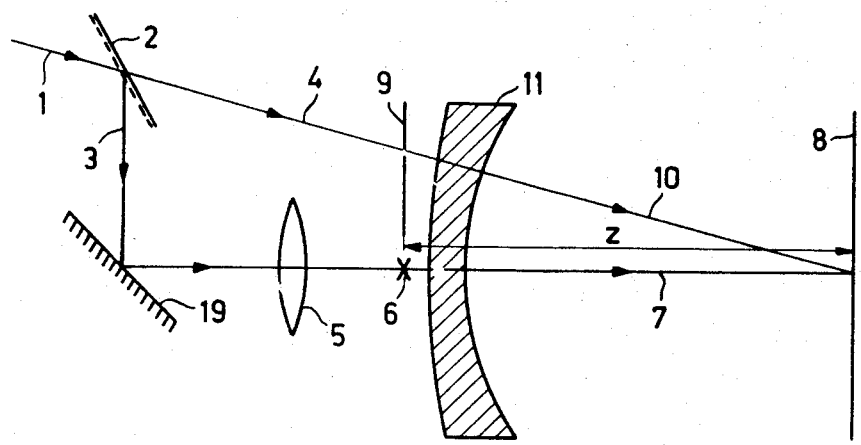

United States Patent
Velzel

[15] 3,653,736
[45] Apr. 4, 1972

[54] HOLOGRAPHIC MULTIPLE IMAGE FORMATION WITH ASTIGMATISM CORRECTION

[72] Inventor: Christiaan Hendrix Frans Velzel, Emmasingel, Eindhoven, Netherlands

[73] Assignee: U.S. Philips Corporation, New York, N.Y.

[22] Filed: June 24, 1970

[21] Appl. No.: 49,280

[30] Foreign Application Priority Data

June 25, 1969 Netherlands..........................6909695

[52] U.S. Cl. .........................................350/3.5, 350/162 ZP
[51] Int. Cl. ....................................................G02b 27/00
[58] Field of Search.......................350/3.5, 162 ZP; 96/36.2

[56] References Cited

UNITED STATES PATENTS 3,529,887  9/1970  Lu ..........................................350/3.5
3,405,614  10/1968  Lin et al................................350/3.5

Primary Examiner—David Schonberg
Assistant Examiner—Ronald J. Stern
Attorney—Frank R. Trifari

[57] ABSTRACT

An apparatus for imaging an illuminated or light-emitting object is discussed by which the image is simultaneously formed at many predetermined locations in space, whilst a hologram of a point array which corresponds to the desired spatial distribution is used as an image forming means and during the reconstruction of the point array from the hologram the usual reference source is replaced by the article or a corresponding image.

It is stated that at least one correcting lens is provided between the image plane and the hologram both during the recording of the hologram and during the reconstruction of the point array.

3 Claims, 3 Drawing Figures

PATENTED APR 4 1972 3,653,736

*INVENTOR.*
C. H. F. VELZEL

BY
AGENT

HOLOGRAPHIC MULTIPLE IMAGE FORMATION WITH ASTIGMATISM CORRECTION

The invention relates to an apparatus for forming an image of an illuminated or light-emitting object the image of which is simultaneously formed at an arbitrary number of predetermined locations in space. A hologram in the form of a point array which corresponds to the desired spatial distribution is used as an image-forming means. In the reconstruction of the point array from the hologram the usual reference source is replaced by the object or an image corresponding thereto.

Such an apparatus is known from the Dutch Pat. application No. 6,810,976 PHD 863). In the known apparatus a hologram is made of an array of point sources. In producing the hologram a reference wave is used which preferably is also emitted by a point source. In the reconstruction of a hologram the object to be imaged is projected at the location of the reference source so that an array of images of the object is obtained at the locations at which the point sources were located during the production of the hologram.

The known apparatus suffers from the disadvantage that the images formed of an object are subject to image defects. It is true that at the center of each image, with the co-ordinates of the point source originally located at this position, the image quality is limited only by the numerical aperture of the hologram, but at other locations in each image the image quality is lower. It proves to be substantially impossible to maintain the aberrations in the images formed within the tolerances which are required, for example, in the manufacture of integrated circuits. The image defects can be described to a good approximation as first differentials of coma, astigmatism, field curvature and distortion.

It is an object of the present invention to provide an apparatus which does not suffer from the aforementioned disadvantage. For this purpose, it is characterized in that at least one correcting lens is placed between the image plane and the hologram both in the production of the hologram and in the reconstruction of the point array.

The invention is based on the recognition that image defects which can be described as differentials of third-order image defects can be compensated by a lens system which has third-order image defects of opposite sign and in which the differentials of third-order image defects are equal in absolute value to the image defects introduced by the hologram.

The apparatus according to the invention enables an image quality to be obtained which is sufficient for many uses for the purpose of manufacturing integrated semiconductor circuits.

Figure 2:
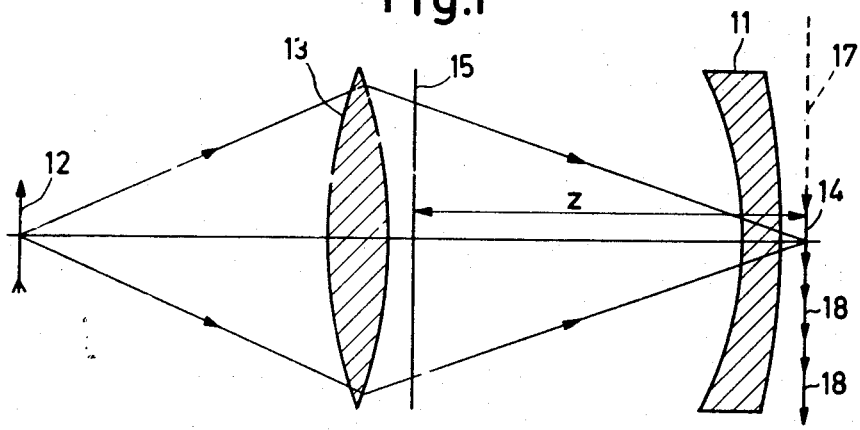
Figure 3:
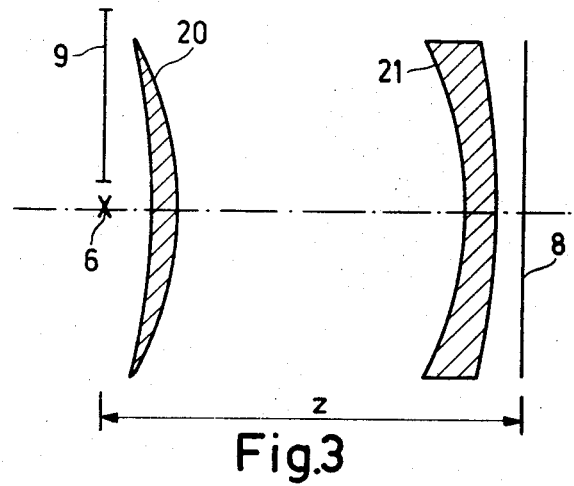

Embodiments of the invention will now be described, by way of example, with reference to the accompanying diagrammatic drawings, in which:

FIG. 1 shows an apparatus according to the invention for producing a hologram of a point array, FIG. 2 shows an apparatus according to the invention for obtaining a multiple image by means of a hologram made by means of the apparatus of FIG. 1, and FIG. 3 illustrates a modification of part of the apparatus of FIG. 1.

In the apparatus shown in FIG. 1, a coherent monochromatic wavefront 1 (for example produced by a laser) is split into wavefronts 3 and 4 by a semitransparent mirror 2. After being reflected at the mirror 19 the wavefront 3 is focussed to a point 6 by a lens 5. The wavefront 7 from the point 6 strikes a photographic plate 8. The wavefront 4 strikes a plate 9 which contains a point array. A wave 10 which emanates from this point array also strikes the photographic plate 8, where it interferes with the reference wave 7. The point array 9 and the reference source 6 preferably are situated in one plane parallel to the photographic plate. A correcting lens 11 is arranged close to this plane; before the waves 7 and 10 strike the photographic plate 8, they first pass through the correcting lens 11.

A hologram 15 of the point array produced by development of the photographic plate 8 can be used to form multiple images. An apparatus for this purpose is shown in FIG. 2 of the drawing.

A lens 13 forms an image 14 of an object 12. The hologram 15 is arranged at a distance $z$ from the image 14 which is equal to the distance which separated the reference source 6 and the photographic plate 8 during the recording of the hologram. A correcting lens 11 (identical to the lens 11 of FIG. 1) is placed in front of an image plate 17 in which the image 14 lies. Obviously, in forming an image of the object 12 in the image 14 the (slight) aberrations of the lens 11 are to be corrected in the lens 13. Multiple images 18 will now be formed by the hologram in the image plane 17 parallel to the hologram 15.

It can be shown that the differential distortion of the images obtained by means of the apparatus described in the Dutch Pat. application No. 6,810,976 can be corrected by a lens system having a distortion:

$$\frac{\Delta x}{x} = -\frac{x^2}{2z^2}$$

in which $x$ is a co-ordinate in the image plane and $z$ is the distance between the exit pupil and the image plane. For the lens system to be effective for correction it must be placed between the point array and the photographic plate and between the hologram and the image plane respectively. The hologram then forms the entrance pupil of the lens system.

The differential astigmatism can be compensated by a system the sagittal field curvature of which is:
$R_s = 1/(2z)$
and the meridian field curvature of which is:
$R_m = 3/(2z)$
The Petzval curvature and the coma of the system must be zero.

A single lens, and hence the lens 11 in FIG. 1 also, always has Petzval field curvature and consequently cannot eliminate all the aberrations.

However, a single thin lens placed in front of the image plane may be used to reduce the distortion. If this lens is given a power $\phi = (-3)/(4z)$, at an index of refraction $n = 3/2$ the astigmatism is partially compensated, for the image field curvatures then will be $R_m = 1/(2z)$ and $R_s = 1/(2z)$, so that the aforesaid conditions are satisfied as far as possible. The differential distortion is substantially compensated by giving the lens the curvatures $R = 0.87/z$ and $R' = 2.37/z$. The stronger curvature must be provided at the side facing the plate 8 and the hologram 15 respectively.

By placing the lens close behind the point array 9 (FIG. 1) and close in front of the image plane 17 (FIG. 2) respectively no coma will occur.

Alternatively, instead of a single "thin" lens 11 close behind the point array or close in front of the image plane respectively a single "thin" lens may be placed close in front of the plate 8 (FIG. 1) and close behind the hologram 15 (FIG. 2) respectively. By this lens the astigmatism is corrected while the distortion is not altered.

The parameters of this lens may, for example, be:

$$n = 1.5, \varphi = \frac{-1}{2z}, R' = -\frac{3}{2z} \text{ and } R = -\frac{5}{2z}.$$

In this case the stronger curvature must face the point array 9 (FIG. 1) and the image plane 17 (FIG. 2) respectively. The shape of the lens is chosen so that the coma is eliminated. Thus, the Petzval curvature $p = \phi/n$ remains as residual aberration. This lens introduces spherical aberration into the image of the reference source which must be compensated by the lens 13.

Instead of a single lens a lens system may be placed between the image plane and the hologram. All third-order aberrations can be corrected by means of a system comprising two "thin" lenses (FIG. 3). The positions of the lenses may, for example, be close behind the point array 9 (lens 20) and close in front of the photographic plate 8 (lens 21).

The parameters of a suitable system are lens 20:

$$n = 1.5, \varphi = \frac{1}{2z}, R = \frac{-0.4}{z}, R' = \frac{-1.4}{z}$$

lens 21:

$$n = 1.5, \varphi = -\frac{1}{2z}, R = -\frac{5}{2z}, R' = -\frac{3}{2z}$$

It will be clear that the use of a more complicated lens system placed between the hologram and the image plane enables the image defects to be compensated with more exactness.

What is claimed is:

1. Apparatus for forming multiple images of an illuminated or light emitting object, comprising a substantially planar multiple point hologram in the path of the light from the object and formed by apparatus comprising a source of coherent radiation, a planar mask having an array of pinhole apertures therein disposed in the path of said radiation, a holographic recording medium in the path of the radiation passing through the mask, means for projecting as a reference beam a portion of the radiation from said coherent source onto said recording medium from a point located in the same plane as the mask and a first lens system located closely adjacent at least one of said mask and said recording medium, the holographic recording medium after the exposure to the radiation comprising the multiple point hologram; lens means for projecting light from the object through the multiple point hologram, whereby multiple images of the object are formed at an image plane, the images having a characteristic astigmatism resulting from reconstruction of the hologram with radiation differing from the radiation with which the hologram was formed; a second lens system substantially identical to the first lens system in the path of the radiation passing through the hologram and placed closely adjacent at least one of said hologram and said image plane, the first and second lens system having an astigmatism substantially equal and opposite to that introduced by the projection of the image of the object through the multiple point hologram.

2. An apparatus as claimed in claim 1, wherein the second lens system is a thin concavo-convex lens which is placed close to the image plane and the surface of which having the stronger curvature faces the hologram.

3. Apparatus as claimed in claim 1, wherein said first lens system comprises a first thin concavo-convex lens positioned close to said mask and having its surface of greater radius of curvature facing said mask and a second thin concavo-convex lens positioned close to said recording medium having its surface of greater radius of curvature facing said recording medium.

* * * * *